United States Patent [19]

Sasaki

[11] Patent Number: 5,271,471
[45] Date of Patent: Dec. 21, 1993

[54] POWER DRIVEN SCREWDRIVER
[75] Inventor: Katsuhiko Sasaki, Anjo, Japan
[73] Assignee: Makita Corporation, Anjo, Japan
[21] Appl. No.: 63,458
[22] Filed: May 18, 1993
[30] Foreign Application Priority Data May 20, 1992 [JP] Japan .................. 4-154508

[51] Int. Cl.[5] ........................................... B25B 23/00
[52] U.S. Cl. ..................................... 173/178; 81/429;
81/58.3; 192/56 R
[58] Field of Search ................ 173/176, 178, 211, 15;
81/429, 58.3; 192/54, 56 R

[56] References Cited

U.S. PATENT DOCUMENTS

| | | | |
|---|---|---|---|
| 3,205,925 | 9/1965 | Wiley | 81/429 |
| 4,630,512 | 12/1986 | Dürr | 81/429 |
| 4,647,260 | 3/1987 | O'Hara et al. | 81/429 |
| 5,060,733 | 10/1991 | Kress | 173/178 |
| 5,134,909 | 8/1992 | Sasaki | 173/176 |

Primary Examiner—Scott Smith
Attorney, Agent, or Firm—Dennison, Meserole, Pollack & Scheiner

[57] ABSTRACT

A power driven screwdriver includes a clutch mechanism provided between a spindle for mounting a driver bit thereon and a drive member rotatably driven by a motor. The clutch mechanism includes a protrusion formed on one of the spindle and the drive member and a recess formed on the other for engagement with the protrusion. The protrusion includes a conical outer surface having a diameter decreasing toward the protrusion. The recess includes a conical inner surface which corresponds substantially to the conical outer surface of the protrusion and has a diameter increasing toward the recess. The conical outer surface has a second central axis displaced from the first central axis of the spindle or the drive member by a first distance. The conical inner surface has a third central axis displaced from the first central axis by a second distance.

10 Claims, 3 Drawing Sheets

POWER DRIVEN SCREWDRIVER

BACKGROUND OF THE INVENTION

1. Field of the Invention

The present invention relates to a power driven screwdriver, and more particularly to an improvement in a clutch mechanism of a power driven screwdriver.

2. Description of the Prior Art

A clutch mechanism in a conventional power driven screwdriver utilizes a pair of claw clutch members for engagement with each other. Such a clutch mechanism may produce unavoidable mechanical sounds when the clutch members are brought into engagement or when they are moved to be separated from each other, and it involves various problems other than the production of mechanical sounds. To solve these problems, it has been proposed to incorporate, into a claw clutch mechanism, a mechanism for forcibly disengage clutch members from each other.

However, such a conventional countermeasure has not provided a satisfactory result due to the nature of the claw clutch mechanism in which the production of mechanical sounds as well as wear of the clutch members are unavoidable.

SUMMARY OF THE INVENTION

It is, accordingly, an object of the present invention to provide a power driven screwdriver including a clutch mechanism which can minimize mechanical sounds and which can be smoothly operated to transmit power or to interrupt transmission.

According to the present invention, there is provided a power driven screwdriver comprising:

a spindle rotatably supported by a housing and movable relative to the housing in an axial direction between a first position and a second position;

the spindle having a first central axis and including a forward end for mounting a driver bit thereon, and the spindle being normally kept at the first portion and being movable to the second position when an axial force is applied to the spindle through the driver bit;

a drive member disposed rearwardly of the spindle on the same axis as the first central axis of the spindle and rotatably driven by a drive source; and a clutch mechanism provided between the spindle and the drive member and including a protrusion formed on one of the spindle and the drive member and a recess formed on the other of the spindle and the drive member for engagement with the protrusion;

the protrusion including a conical outer surface having a diameter decreasing toward the protrusion, and the recess including a conical inner surface corresponding substantially to the conical outer surface and having a diameter increasing toward the recess;

the conical outer surface having a second central axis displaced from the first central axis of the spindle or the drive member by a first distance, and the conical inner surface having a third central axis displaced from the first central axis by a second distance; and the protrusion and the recess being kept in disengagement from each other so as to interrupt transmission of rotation from the drive member to the spindle when the spindle is positioned at the first position, the protrusion and the recess being brought in engagement with each other through contact between the conical outer surface and the conical inner surface when the spindle is positioned at the second position.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 1:
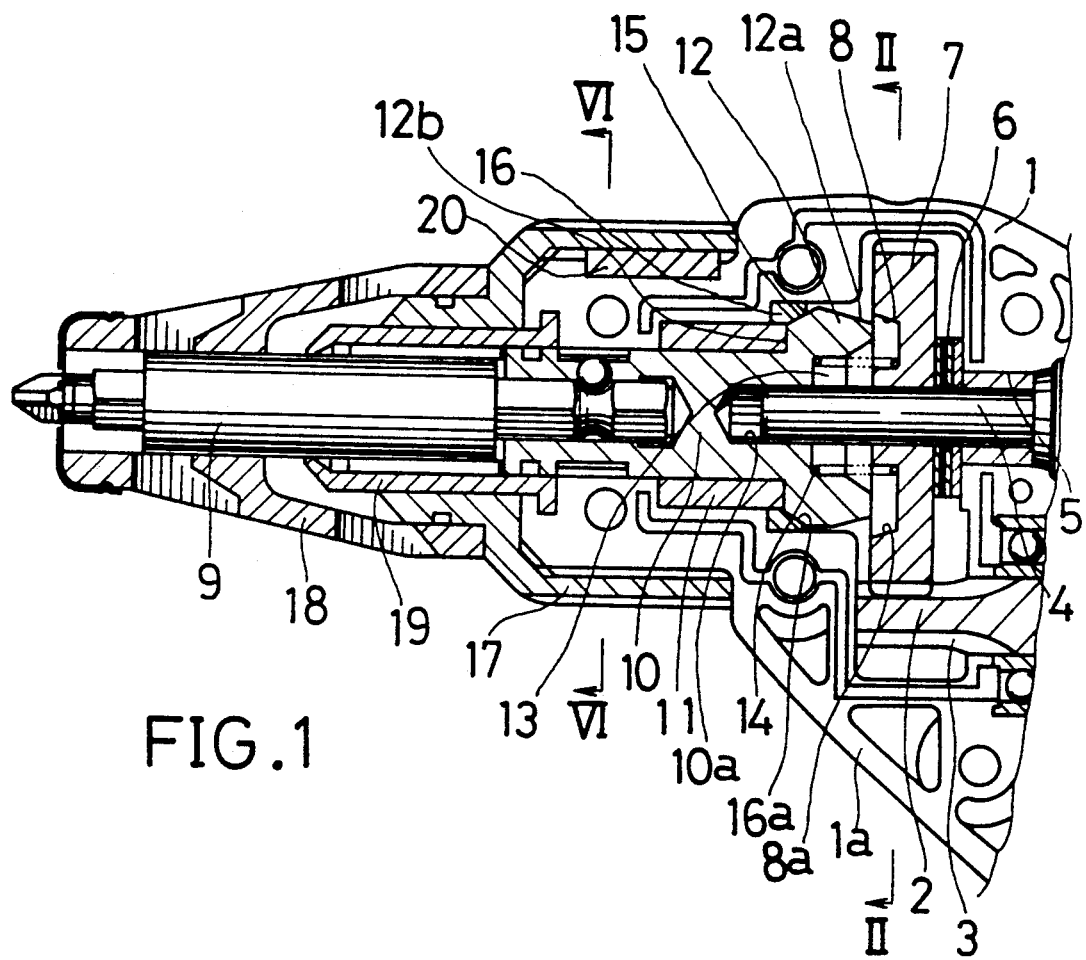
FIG. 1 is a vertical sectional view, with a part omitted, of a power driven screwdriver according to an embodiment of the present invention.

Referring to FIG. 1, a part of a power driven screwdriver is shown in vertical sectional view. The power driven screwdriver includes a housing 1 within which a motor (not shown) having a motor shaft 2 is accommodated. The motor shaft 2 extends into a gear housing 1a formed integrally with the housing 1. A gear 3 is formed integrally with the forward end of the motor shaft 2.

A support shaft 4 is disposed within the gear housing 1a. One end of the support shaft 4 is rotatably supported by the gear housing 1a through a metal bearing 5 and a thrust bearing 6. The other end of the support shaft 4 is rotatably received within an axial bore 10a of a spindle 10 as will be explained later.

Figure 2:
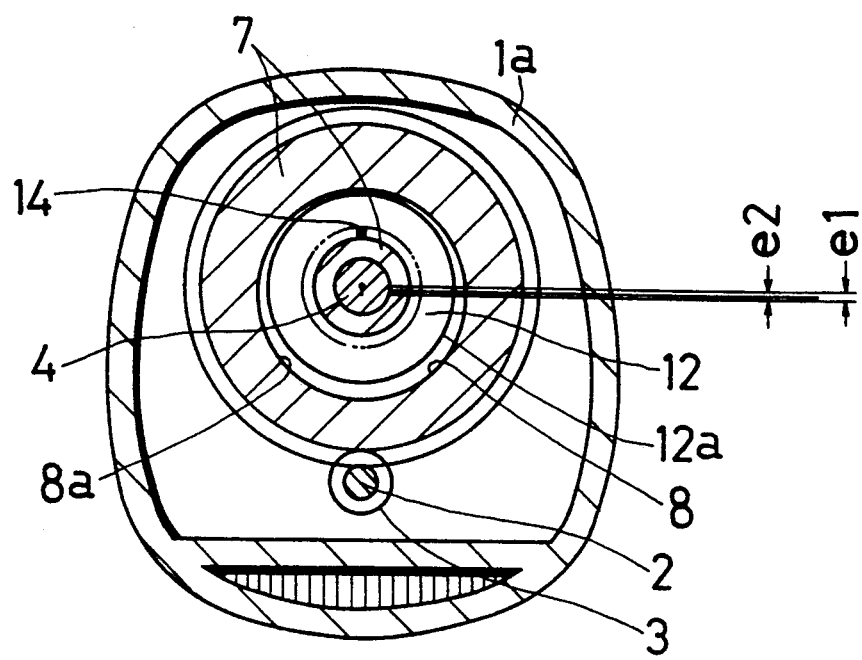
FIG. 2 is a sectional view taken along line II—II in FIG. 1.
Figure 3:
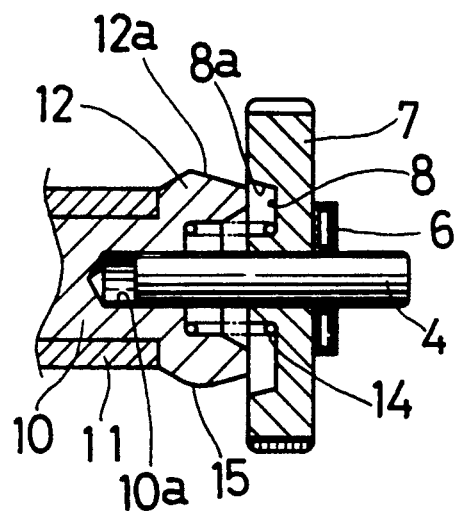
FIG. 3 is a view showing a main part of FIG. 1.

A main gear 7 is slidably fitted on the support shaft 4 and is in engagement with the gear 3 of the motor shaft 2. The rear surface of the main gear 7 is in abutment on the thrust bearing 6. The main gear 7 includes an annular recess 8 on the front surface thereof. The recess 8 includes a conical circumferential inner wall 8a having a diameter which increases in the forward direction. The central axis of the conical inner wall 8a is displaced from the central axis of the main gear 7 or the central axis of the support shaft 4 by a short distance e1 as shown in FIG. 2.

The spindle 10 is disposed within the gear housing 1a at a position forwardly of the main gear 7 and extends on the same axis as the support shaft 4. A driver bit 9 is detachably mounted on the forward portion of the spindle 10. The spindle 10 is supported by the gear housing 1a through a metal bearing 11 in such a manner that the spindle 10 is rotatable relative to the gear housing 1a and is slidably movable by a predetermined distance in the axial direction. An enlarged annular protrusion 12 is integrally formed with the rear end of the spindle 10 for engagement with the annular recess 8 of the main gear 7. The annular protrusion 12 includes a conical outer surface 12a which has the same inclination angle as that of the conical inner wall 8a of the annular recess 8 of the main gear 7. The central axis of the conical outer surface 12a is displaced from the central axis of the spindle 10 by a short distance e2 as shown in FIG. 2, so that the outer surface 12a slidably contacts the inner wall 8a when the annular protrusion 12 is in engagement with the annular recess 8 as shown in FIG. 4.

Figure 4:
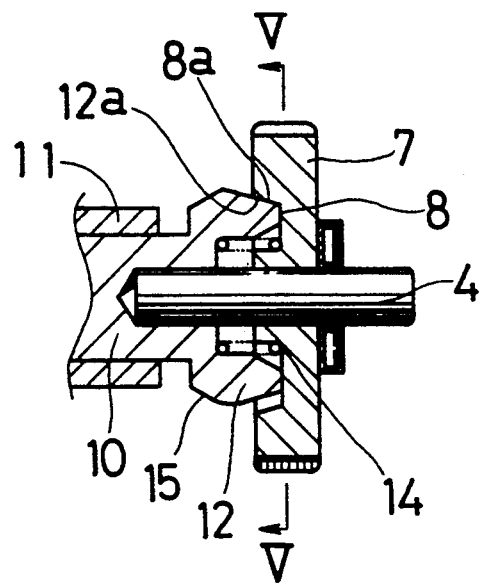
FIG. 4 is a view similar to FIG. 3 but showing a different operation.
Figure 5:
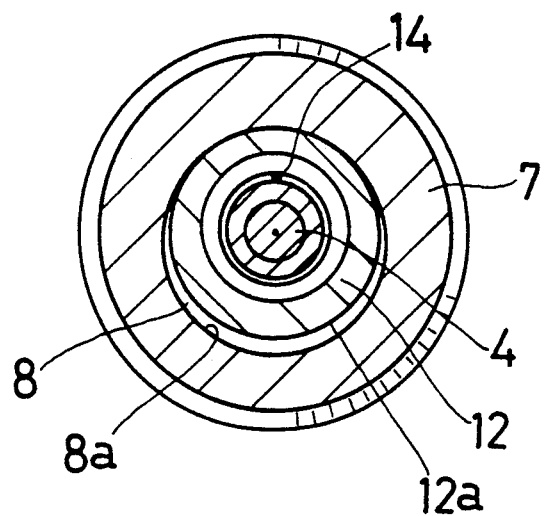
FIG. 5 is a sectional view taken along line V—V in FIG. 4.

In this embodiment, the diameter of the conical outer surface 12a is determined to be smaller than that of the conical inner wall 8a within the region where the outer surface 12a is within the outer wall 8a when the annular protrusion 12 is fully engaged with the annular recess 8 as shown in FIG. 4. Further, the displaced distance e2 of the outer surface 12a is determined to be smaller than the displaced distance e1 of the inner wall 8a.

A compression spring 14 is interposed between the annular protrusion 12 of the spindle 10 and the main gear 7 so as to normally keep the annular protrusion 12 not to engage the annular recess 8 of the main gear 7. One end of the spring 14 is received within a recess 13 formed inside of the annular protrusion 12, and the other end of the compression spring 14 is received within the annular recess 8 of the main gear 7.

The annular protrusion 12 includes an end surface 12b which is opposed to the rear end of the metal bearing 11 in the axial direction. The end surface 12b is kept to slidably contact the rear end of the metal bearing 11 by the biasing force of the spring 14 when no axial load is applied to the spindle 10. The end surface 12b is separated from the rear end of the metal bearing 11 when the spindle 10 is axially moved against the force of the spring 14 and when the annular protrusion 12 is brought into engagement with the annular recess 8 of the main gear 7 for transmission of rotation.

The annular protrusion 12 of the spindle 10 further includes a conical engaging surface 15 which is formed between the outer surface 12a and the end surface 12b. The diameter of the engaging surface 15 decreases in the forward direction, and the central axis of the engaging surface 15 is displaced from the central axis of the spindle 10 by a short distance. A ring 16 made of rubber is mounted within the gear housing 1a and is fixedly received within a space formed between the rear end of the metal bearing 11 and the inner surface of the gear housing 1a. The ring 16 includes a conical inner surface 16a. The central axis of the inner surface 16a is displaced from the central axis of the spindle 10 by the same distance as the central axis of the engaging surface 15. Further, the inner surface 16a has the same inclination angle as that of the engaging surface 15. The engaging surface 15 is brought into engagement with the inner surface 16a of the ring 16 through its entire surface so as to prevent the spindle 10 from rotation when the spindle 10 is moved to disengage the annular protrusion 12 from the annular recess 8 and when the central axis of the engaging surface 15 coincides with the that of the inner surface 16a.

A lock ring 17 is threadably engaged with the forward portion of the gear housing 1a, so that the position of the lock ring 17 is adjustable relative to the gear housing 1a in the axial direction. A tubular stopper sleeve 18 is fitted on the forward end of the lock ring 17 and the driver bit 9 extends through the stopper sleeve 18. A tubular dust-prevention member 19 is fitted within the forward portion of the lock ring 17 and extends over both the forward portion of the spindle 10 and the rear portion of the driver bit 9 so as to prevent entrance of dust into the gear housing 1a.

Figure 6:
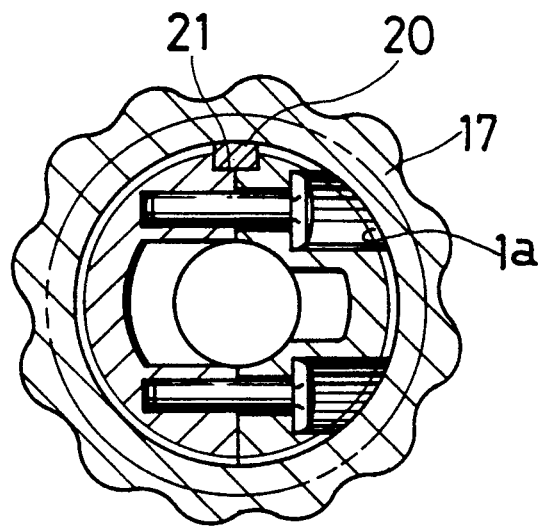
FIG. 6 is a sectional view taken along line VI—VI in FIG. 1.

As shown in FIG. 6, an elongated stop member 20 made of synthetic resin such as nylon or a rubber is interposed between the forward portion of the gear housing 1a and the lock ring 17. The stop member 20 is partly received within a recess 21 formed on the forward portion of the gear housing 1a and frictionally contacts the inner surface of the lock ring 17 so as to keep the adjusted position of the lock ring 17.

The operation of the above embodiment will now be explained.

Firstly, an operator rotates the lock ring 17 relative to the gear housing 1a so as to adjust the axial position of the stopper sleeve 18 in correspondence to the desired driving depth of a screw to be driven. The screw is thereafter fitted on the forward end of the driver bit 9 and the operator brings the screwdriver so as to abut the screw on a work.

At this stage, the annular protrusion 12 is kept in disengagement from the annular recess 8 of the main gear 7 by the biasing force of the spring 14. Therefore, when the motor is started, the rotation of the motor shaft 2 is not transmitted to the spindle 10 or the driver bit 9 although it is transmitted to the main gear 7.

When the operator moves the screwdriver to press the screw fitted on the driver bit 9 toward the work, the spindle 10 is moved together with the driver bit 9 in the axial direction toward the main gear 7 against the biasing force of the spring 14. The annular protrusion 12 of the spindle 10 is therefore moved to be engaged with the annular recess 8 in such a manner that, during rotation of the main gear 7 at the beginning of movement, the conical outer surface 12a intermittently contacts the conical inner wall 8a of the annular recess 8 by a part which is positioned most remotely from the central axis, and thereafter the conical outer surface 12a continuously contacts the inner wall 8a during rotation of the main gear 7 as the central axes of the inner wall 8a and the outer surface 12a are positioned in alignment with each other with respect to the central axis of the spindle 10.

Thus, the rotation of the main gear 7 is transmitted to the spindle 10, so that the driver bit 9 is rotated to drive the screw into the work.

The screwdriver is moved toward the work as the screw is driven into the work and is stopped when the forward end of the stopper sleeve 18 abuts on the work. At this stage, a smaller axial force or load is applied from the spindle 10 to the main gear 7 through the driver bit 9, so that the difference is produced between the rotational torque of the spindle 10 and that of the main gear 7. Consequently, the spindle 10 is moved forwardly by the biasing force of the spring 14 and the reaction force which may be produced between the outer surface 12a of the annular protrusion 12 of the spindle 10 and the inner wall 8a of the annular recess 8. Thus, the annular protrusion 12 is automatically disengaged from the annular recess 8, and the rotation of the main gear 7 is not transmitted to the spindle 10.

As the spindle 10 is further moved forwardly, the engaging surface 15 of the annular protrusion 12 is brought into contact with the inner surface 16a of the ring 16, so that the rotation of the spindle 10 is stopped through frictional force which may be produced between the engaging surface 15 and the inner surface 16a of the ring 16. Because of displacement of the central axes of the engaging surface 15 and the inner surface 16a from the central axis of the spindle 10, the rotation of the spindle 10 may be gradually reliably stopped.

Meanwhile, in this embodiment, if the operator further press the screw toward the work after compression of the driving operation, the annular protrusion 12 of the spindle 10 is kept in engagement with the annular recess 8 of the main gear 7 in such a manner that the outer surface 12a of the annular protrusion 12 and the inner wall 8a of the recess 8 continuously contact each other during rotation of the main gear 7. Thus, the screw is further tightened.

Although, in the above embodiment, the distance e2 of displacement of the outer surface 12a of the of the annular protrusion 12 is determined to be smaller than the distance e1 of displacement of the inner wall 8a of the main gear 7, the distance e2 and e1 may be equal to each other. Further, although the diameter of the conical outer surface 12a is determined to have a smaller diameter than that of the conical inner wall 8a within the region where the outer surface 12a is within the outer wall 8a when the annular portion 12 is fully engaged with the annular recess 8, they may be equal to each other. In such a case, the outer surface 12a and the inner wall 8a may contact each other throughout their entire surfaces.

Additionally, although, in the above embodiment, the recess 8 is formed on the main gear 7, and the annular protrusion 12, on the spindle 10, the recess 8 may be formed on the spindle 10, and the annular protrusion 12, on the main gear 7.

While the invention has been described with reference to a preferred embodiment, it is to be understood that modifications or variation may be easily made without departing from the spirit of this invention which is defined by the appended claims.

What is claimed is:

1. A power driven screwdriver comprising:
  a spindle rotatably supported by a housing and movable relative to said housing in an axial direction between a first position and a second position;
  said spindle having a first central axis and including a forward end for mounting a driver bit thereon, and said spindle being normally kept at said first portion and being movable to said second position when an axial force is applied to said spindle through said driver bit:
  a drive member disposed rearwardly of said spindle on the same axis as said first central axis of said spindle and rotatably driven by a drive source;
  a clutch mechanism provided between said spindle and said drive member and including a protrusion formed on one of said spindle and said drive member and a recess formed on the other of said spindle and said drive member for engagement with said protrusion;
  said protrusion including a conical outer surface having a diameter decreasing toward said protrusion, and said recess including a conical inner surface corresponding substantially to said conical outer surface and having a diameter increasing toward said recess;
  said conical outer surface having a second central axis displaced from said first central axis of said spindle or said drive member by a first distance, and said conical inner surface having a third central axis displaced from said first central axis by a second distance; and
  said protrusion and said recess being kept in disengagement from each other so as to interrupt transmission of rotation from said drive member to said spindle when said spindle is positioned at said first position, said protrusion and said recess being brought in engagement with each other through contact between said conical outer surface and said conical inner surface when said spindle is positioned at said second position.

2. The power driven screwdriver as defined in claim 1 wherein said protrusion is integrally formed with the rear end of said spindle, and wherein said recess is formed on said drive member.

3. The power driven screwdriver as defined in claim 1 wherein said drive member is a drive gear in engagement with a gear formed on a motor shaft of said motor.

4. The power driven screwdriver as defined in claim 1 wherein said protrusion and said recess are of annular configuration.

5. The power driven screwdriver as defined in claim 1 and further including a brake means for preventing said spindle from rotation at said first position.

6. The power driven screwdriver as defined in claim 5 wherein said brake means including a conical engaging surface formed on a part of said spindle and a ring mounted on said housing, said engaging surface having a fourth central axis displaced from said first central axis of said spindle, said ring being made of resilient material such as rubber and having a conical inner surface corresponding to said engaging surface for engagement therewith when said spindle is positioned at said first position.

7. The power driven screwdriver as defined in claim 1 and further including a biasing means interposed between said spindle and said drive member for normally biasing said spindle toward said first position.

8. The power driven screwdriver as defined in claim 1 and further including a stopper sleeve mounted on said housing for abutting on a work, and adjusting means for adjusting the position of said stopper sleeve relative to said spindle.

9. The power driven screwdriver as defined in claim 8 wherein said adjusting means is an adjustable ring threadably engaged with said housing, and wherein said stopper sleeve is fixedly mounted on said adjustable ring.

10. The power driven screwdriver as defined in claim 9 and further including a stopper member for providing frictional resistance between said adjustable ring and said housing so as to maintain said stopper member in position relative to said housing.

* * * * *